(12) United States Patent
Kim et al.

(10) Patent No.: US 7,947,390 B2
(45) Date of Patent: May 24, 2011

(54) REINFORCED POUCH TYPE SECONDARY BATTERY

(75) Inventors: Sang-Bum Kim, Cheonan (KR); Chang-Ho Kim, Suwon (KR); Youn-Han Chang, Osan (KR); Won-Chull Han, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 12/761,983

(22) Filed: Apr. 16, 2010

(65) Prior Publication Data

US 2010/0203381 A1    Aug. 12, 2010

Related U.S. Application Data

(63) Continuation of application No. 10/462,729, filed on Jun. 17, 2003, now Pat. No. 7,722,984.

(30) Foreign Application Priority Data

Jun. 17, 2002  (KR) .............................. 2002-0033721

(51) Int. Cl.
   *H01M 2/02*       (2006.01)
(52) U.S. Cl. ........ 429/176; 429/136; 429/141; 429/162; 429/163; 429/175; 429/177; 429/186

(58) Field of Classification Search .................. 429/176, 429/136, 141, 162, 163, 175, 186, 177
See application file for complete search history.

(56) References Cited

U.S. PATENT DOCUMENTS

| | | | |
|---|---|---|---|
| 6,042,966 | A | 3/2000 | Cheu |
| 6,106,973 | A | 8/2000 | Sonozaki et al. |
| 6,743,546 | B1 | 6/2004 | Kaneda et al. |
| 2001/0051298 | A1 | 12/2001 | Hanafusa et al. |
| 2003/0133254 | A1 | 7/2003 | Chen |
| 2003/0232241 | A1* | 12/2003 | Woehrle et al. ............... 429/127 |

* cited by examiner

*Primary Examiner* — Jane Rhee
(74) *Attorney, Agent, or Firm* — H.C. Park & Associates, PLC (57) ABSTRACT

A pouch type secondary battery having enhanced reliability by protecting the battery from external impacts is described. A reinforcement structure may be installed on a pouch casing and an electrode assembly housed in the pouch casing. Short-circuits inside the pouch casing may be minimized. The pouch type secondary battery has an electrode assembly with positive and negative electrode plates with a separator interposed therebetween, and positive and negative terminal portions extending from the positive and negative electrode plates. A first reinforcement member is closely adhered to one or more planes of the electrode assembly. A second reinforcement member may be adhered to the pouch casing and used with or without the first reinforcement member.

20 Claims, 14 Drawing Sheets

REINFORCED POUCH TYPE SECONDARY BATTERY

CROSS REFERENCE TO RELATED APPLICATIONS

This application is a continuation of U.S. patent application Ser. No. 10/462,729 filed Jun. 17, 2003 and claims the priority of Korean Patent Application No. 2002-33721, filed on Jun. 17, 2002, which are hereby incorporated by reference for all purposes as if fully set forth herein.

BACKGROUND OF THE INVENTION

1. Field of the Invention

The present invention relates to a secondary battery, and more particularly, a secondary battery in a pouch casing with a reinforcement structure.

2. Description of the Related Art

Secondary batteries are rechargeable and can be made in small sizes with high capacities. Typical examples of secondary batteries include nickel-metal hydride (Ni-MH) batteries and lithium (Li) secondary batteries.

Secondary batteries are classified into cylindrical batteries using a cylindrical aluminum can, rectangular batteries using a rectangular aluminum can, and pouch type batteries where the battery is accommodated in a thin-film pouch type casing.

Figure 1:
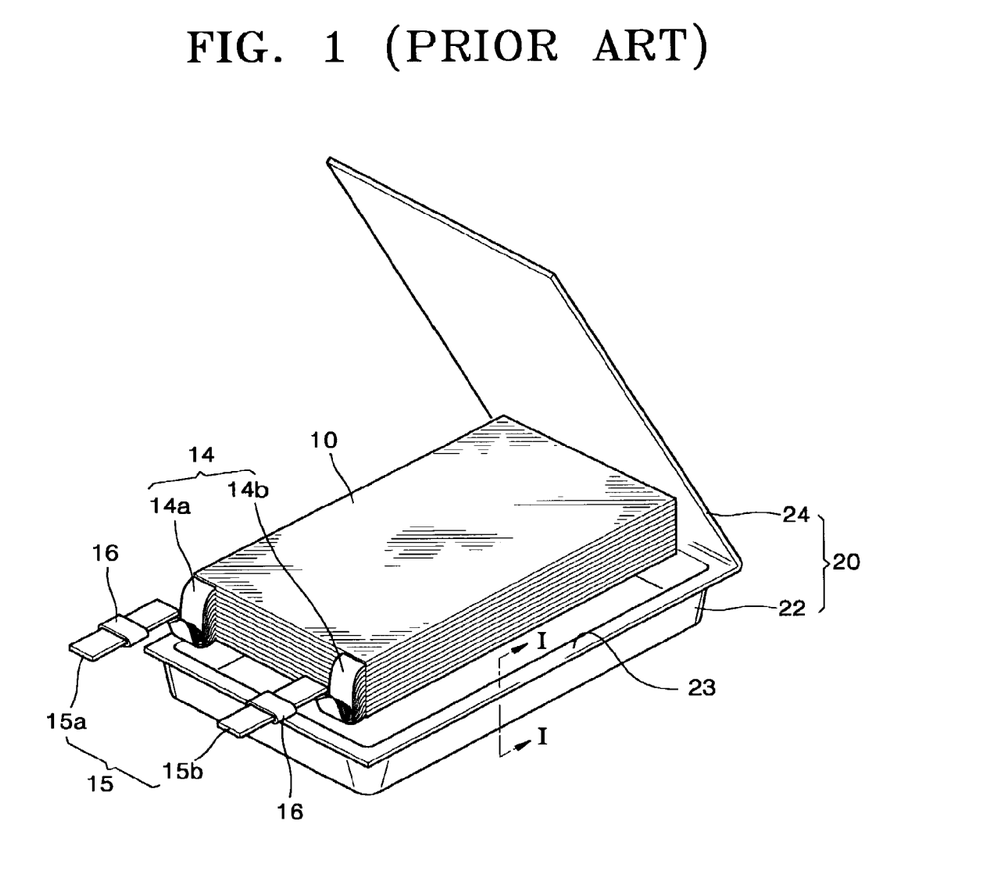
FIG. 1 is an extracted perspective view of a conventional pouch type secondary battery.

A pouch type secondary battery, as shown in FIG. 1, includes an electrode assembly 10 which generates a predetermined current, and a pouch casing 20 which encloses and hermetically seals the electrode assembly 10. The electrode assembly 10 has an electrode tab 14 drawn from one side which is connected with a lead 15 that serves as an electrical path leading outside. The lead 15 has a protective tape 16 adhered to its surface so that it extends outside the pouch casing 20.

The pouch casing 20 includes a case body 22 having an internal space in which the electrode assembly 10 is retained, and a cover 24 integrally extending from one end of the case body 22. A flange 23 is formed at the periphery of the case body 22 and is configured to be welded with the cover 24 to hermetically seal the case body 22.

Figure 2:
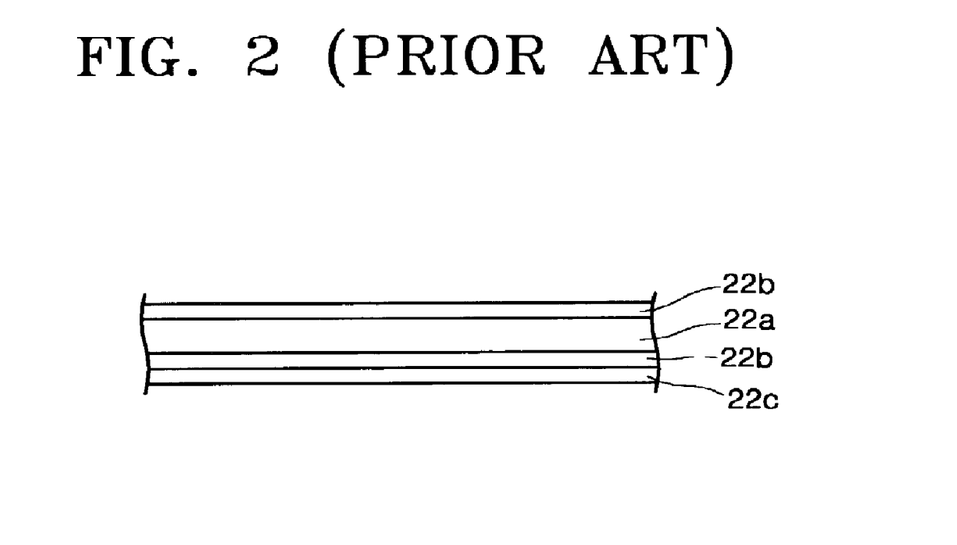
FIG. 2 is a cross-sectional view illustrating various materials of a general pouch.

The pouch casing 20 of the pouch type secondary battery having the above-described configuration is typically made of a metal foil and resin materials. FIG. 2 is a cross-sectional view taken along the line I-I shown in FIG. 1. As shown in FIG. 2, the pouch casing 20 is formed of composite materials compressed such that a thermal adhesion layer 22b is formed on the inner face of a foil 22a. The thermal adhesion layer 22b may be formed from denatured polypropylene, e.g., cast polypropylene (CPP). The foil 22a may be made of a metal, e.g., Al. A sheathing 22c made of a polymer resin, e.g., nylon or polyethyleneterephthalate (PET), is formed on the outer face of the foil 22a. The thermal adhesion layer interposed between the foil 22a and the sheathing 22c. Thus, the pouch casing 20 can be sealed by heat compression in a state in which thermal adhesion layers of the case body 22 and the pouch cover 24 are joined to each other.

However, since the pouch casing having the above-described configuration is very thin, there is a limitation in protecting the electrode assembly housed in the pouch casing. In particular, in such a pouch casing, the thickness of a metal foil provided for the purpose of maintaining the strength of the casing is only several tens of micrometers. Accordingly, the metal foil is very weak against external impacts.

When a battery using the conventional pouch casing is cut or shocked by a sharp tool, the safety of the battery may be impaired, resulting in poor reliability.

In such a pouch casing, the melting point of the thermal adhesion layer made of, for example, CPP, is about 130° C. to 140° C., and the melting point of a separator of the electrode assembly housed in the pouch casing is also about 130° C. to 140° C. The temperature of thermally welding a case body and a pouch cover of the pouch casing is about 180° C. to 210° C. Thus, during thermal welding of the pouch, the thermal adhesion layer and the separator may melt, or the separator may be fusibly fixed with the thermal adhesion layer. Also, the thermal adhesion layer melts exposing the Al metal film inside, so that the Al metal film may be short-circuited from the electrode assembly.

Figure 3:
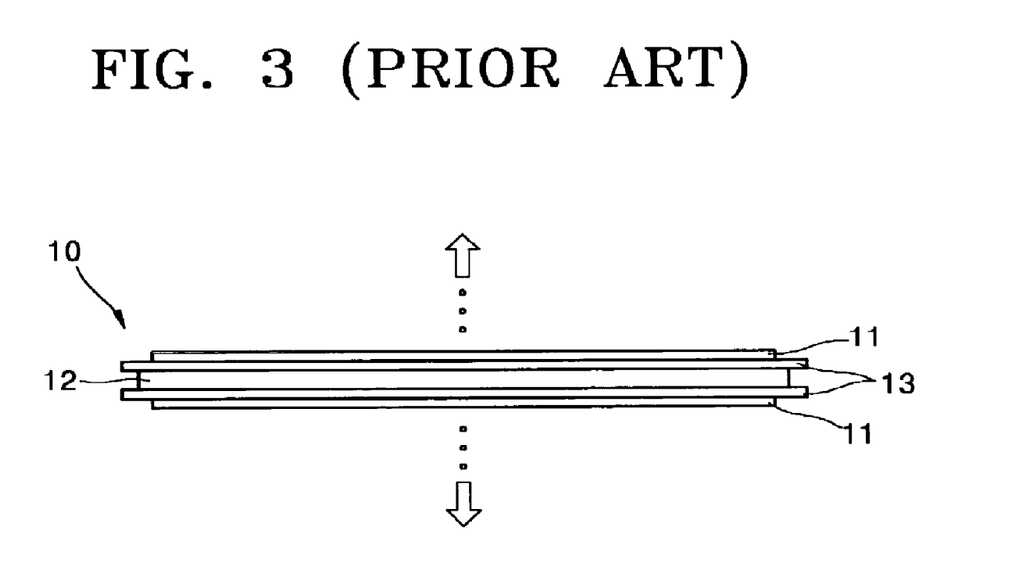
FIG. 3 is a cross-sectional view illustrating a bi-cell stacked structure of a general stacked electrode assembly.

In a lithium polymer secondary battery, a stacked electrode assembly is housed in the pouch casing and has a bi-cell structure, as shown in FIG. 3. The bi-cell structure is a unit of an electrode assembly, and is generally constructed such that a positive electrode sheet 11 is stacked on both faces of a negative electrode sheet 12 with a separator 13 interposed between each of the positive and negative electrode sheets 11 and 12. As shown in FIG. 3, the area of each separator 13 defining the positive and negative electrode sheets 11 and 12 is greatest and the area of the positive electrode sheet 11 is smallest. A plurality of bi-cell laminates is stacked to form an electrode assembly 10.

As described above, when the electrode assembly 10 having a plurality of bi-cell laminates stacked is housed in a pouch casing, the battery swells due to gas generated inside the battery as the battery is repeatedly charged and discharged. When gas is generated inside electrode sheets of the electrode assembly, the electrode sheets may swell in a direction indicated by an arrow shown in FIG. 3, while the separator 13 shrinks somewhat. Accordingly, the positive electrode sheet 11 and the negative electrode sheet 12 may be short-circuited from each other at their edges.

Therefore, it is necessary to protect the battery from short-circuit due to swelling of the electrode assembly.

U.S. Pat. No. 6,042,966 discloses a battery structure for preventing electrical short between an electrode tab exposed outward and a cut edge of a pouch, wherein the pouch comprises an outer lamination layer made of a packaging insulator film on the outer face of a metal foil, and an inner lamination layer having a polyamide layer made of, for example, nylon, and a thermal adhesion layer sequentially formed on the inner face of the metal foil.

U.S. Pat. No. 6,106,973 discloses a pouch formed by folding a laminated film having an Al film at the inner side and a polypropylene film at the outer side on both sides of an electrode assembly.

The above-described pouches having thin films still have several drawbacks including poor structural stability. Also, in the case of using a stacked electrode assembly, short-circuit between electrodes may occur due to swelling of the electrode assembly.

SUMMARY OF THE INVENTION

Accordingly, the invention provides a pouch type secondary battery having enhanced reliability by protecting the battery from external impacts by separately installing a reinforcement structure on a pouch casing and on an electrode assembly housed in the pouch casing.

Also, the present invention provides a pouch type secondary battery having enhanced reliability by minimizing a short-circuit inside a pouch casing.

In accordance with an aspect of the present invention, there is provided a pouch type secondary battery comprising an electrode assembly having positive and negative electrode plates with a separator interposed therebetween. Positive and negative terminal portions extend from the positive and negative electrode plates. A first reinforcement member is adhered to at least one plane of the electrode assembly. A pouch casing houses the electrode assembly and the first reinforcement member and exposes the positive and negative terminal portions to the outside. The positive and negative terminal portions are insulated from each other at sealed portions of the pouch casing.

The first reinforcement member may be a metal foil. Also, the first reinforcement member may have a first layer made of a metal foil and a second layer made of an adhesive resin material. The first reinforcement member may have a fiber reinforced resin material. Further, the first reinforcement member may have an insulating tape. The first reinforcement member may have a thermal adhesion layer adhered to a plane facing the electrode assembly by heat. Also, the first reinforcement member may be fixed to the electrode assembly by an insulating tape.

Further, an insulating terminal cover having insertion holes into which the positive and negative terminal portions may be inserted to be exposed outside may be installed at lateral planes of the electrode assembly from which the positive and negative terminal portions extend.

In accordance with another aspect of the present invention, there is provided a pouch type secondary battery including an electrode assembly having positive and negative electrode plates with a separator interposed. Positive and negative terminal portions extend from the positive and negative electrode plates. An insulating tape is adhered to at least one plane of the electrode assembly. A pouch casing houses the electrode assembly adhered to the insulating tape and exposes the positive and negative terminal portions to the exposed outside. The positive and negative terminal portions are insulated from each other at sealed portions of the pouch casing.

An insulating terminal cover having insertion holes into which the positive and negative terminal portions may be inserted to be exposed outside may be installed at lateral planes of the electrode assembly from which the positive and negative terminal portions extend.

In accordance with still another aspect of the present invention, there is provided a pouch type secondary battery including an electrode assembly having positive and negative electrode plates with a separator interposed therebetween. Positive and negative terminal portions extend from the positive and negative electrode plates. A pouch casing houses the electrode assembly and exposes the positive and negative terminal portions to the outside. The positive and negative terminal portions are insulated from each other at a sealed portion of the pouch casing. A second reinforcement member is adhered to at least one plane of the internal surfaces of the pouch casing.

The second reinforcement member may be a metal foil. Also, the second reinforcement member may have a third layer made of a metal foil and a fourth layer made of an adhesive resin material. The second reinforcement member may have a fiber reinforced resin material. Further, the second reinforcement member may have an insulating tape. The second reinforcement member may have a thermal adhesion layer adhered to a plane facing the electrode assembly by heat. Also, the second reinforcement member may be fixed to the electrode assembly by an insulating tape.

BRIEF DESCRIPTION OF THE DRAWINGS

These and other objects and advantages of the invention will become apparent and more readily appreciated from the following description of the embodiments, taken in conjunction with the accompanying drawings.

DETAILED DESCRIPTION OF THE EMBODIMENTS

Preferred embodiments of the present invention will be described with reference to the appended drawings.

Figure 4:
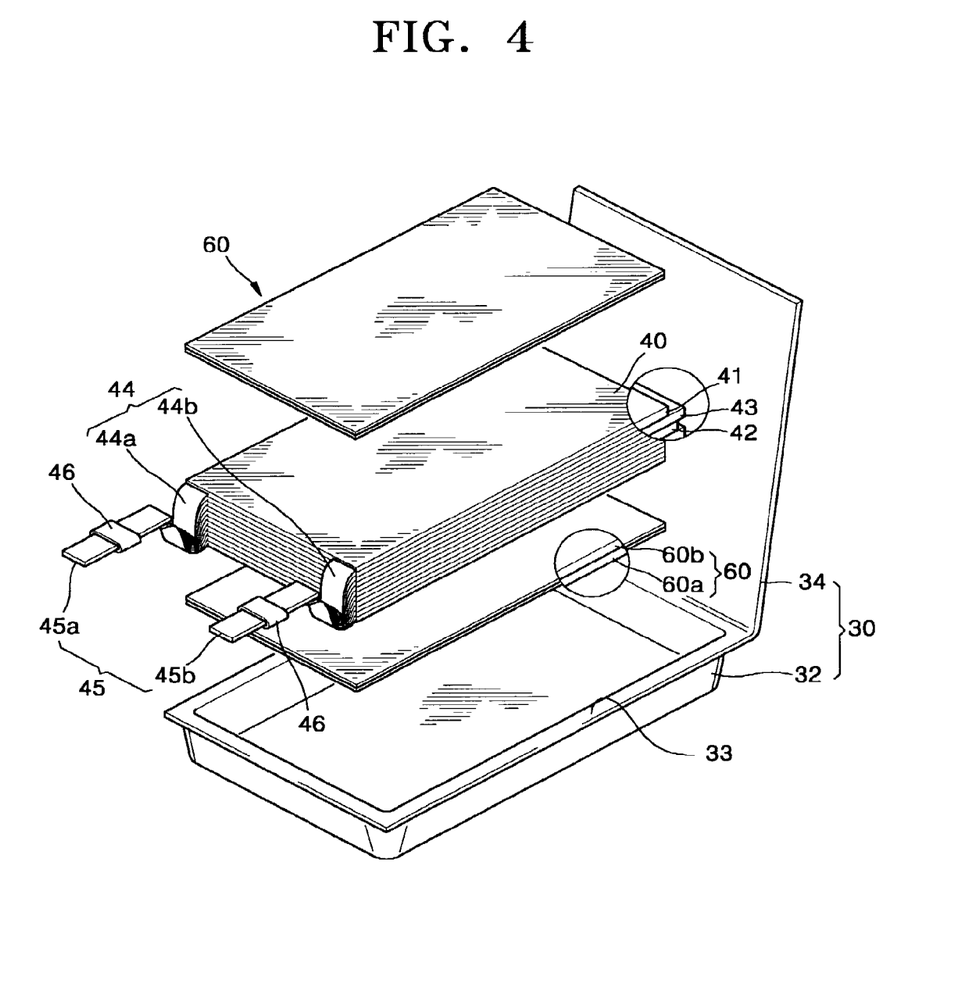
FIG. 4 is an exploded perspective view of a pouch type secondary battery having a stacked electrode assembly according to an embodiment of the present invention.

FIG. 4 is an exploded perspective view of a pouch type secondary battery according to an embodiment of the present invention. As shown in FIG. 4, an electrode assembly 40 is of a stacked type in which a plurality of bi-cell stacked structures each having positive and negative electrode plates 41 and 42 with a separator 43 interposed therebetween, are stacked. The stacked electrode assembly 40 shown in FIG. 4 is typically used in polymer lithium secondary batteries. The positive electrode plate 41 is formed by thermally compressing a positive electrode sheet containing a positive electrode active material comprising lithium oxide on at least one plane of a positive electrode current collector made of a metal foil, e.g., an aluminum foil. The negative electrode plate 42 is formed by thermally compressing a negative electrode sheet containing a negative electrode active material comprising a carbon material on at least one plane of a negative electrode current collector made of a metal foil, e.g., a copper foil. The electrode assembly 40 is housed in a pouch casing 30, and an electrolytic solution is impregnated into the electrode assembly 40, followed by sealing the pouch casing 30, thereby forming a secondary battery.

Electrode tabs 44 drawn from each of the electrode plates 41 and 42 are provided at one side of the stacked electrode assembly 40, and electrode lead portions 45 are welded to the electrode tabs 44. The positive electrode tabs 44a are drawn from the positive electrode plate 41 and a positive electrode lead 45a is welded to the positive electrode tabs 44a. Negative electrode tabs 44b are drawn from the negative electrode plate 42 and a negative electrode lead 45b is welded to the negative electrode tabs 44b. The positive and negative electrode leads 45a and 45b are exposed outside the pouch casing 30 even after being sealed, forming electrode terminals in cooperation with the electrode tabs 44 and the electrode lead portions 45. A polymeric protective tape 46 for protecting the electrode terminals is adhered to the electrode lead portion 45 so that the electrode terminals are insulated from each other when the case body 32 and a pouch cover 34 are sealed.

Figure 5:
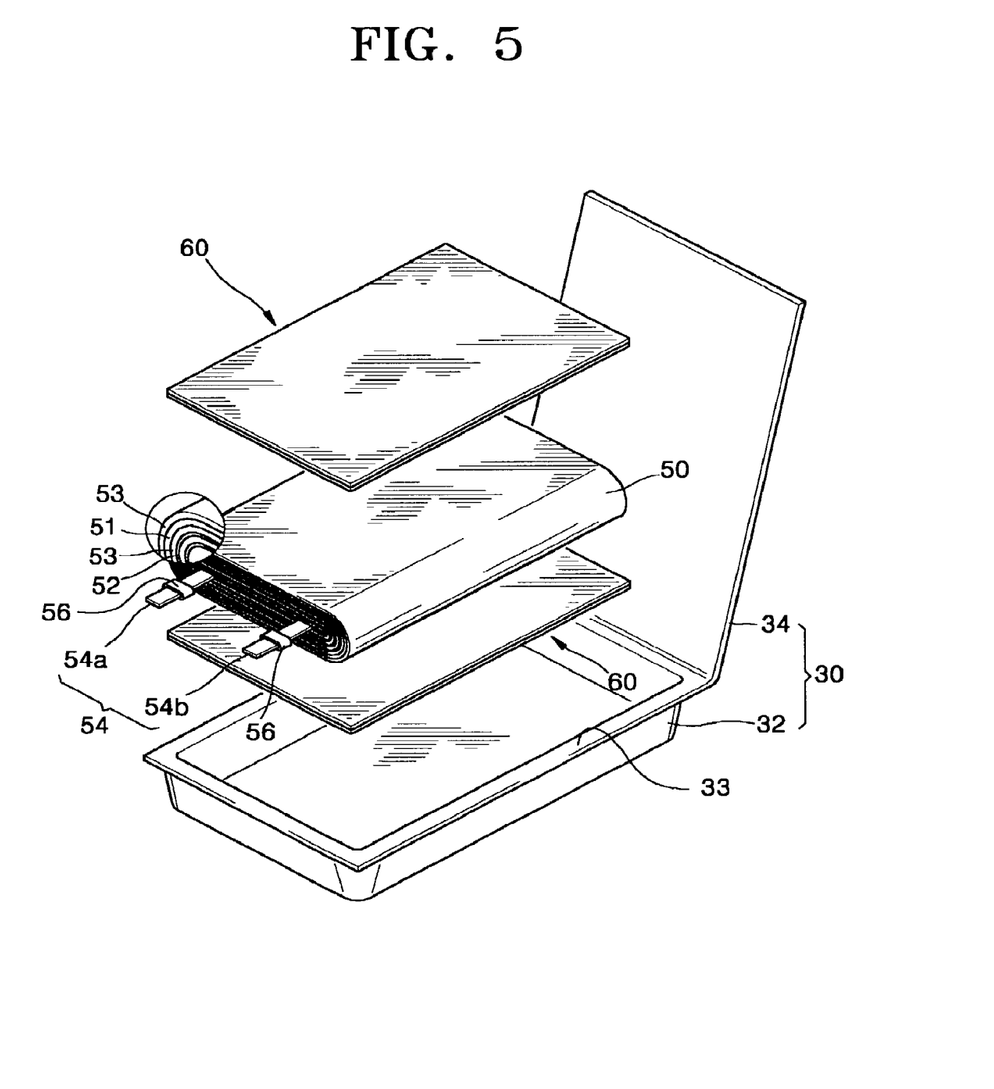
FIG. 5 is an exploded perspective view of a pouch type secondary battery having a wound electrode assembly according to another embodiment of the present invention.

The electrode assembly may be a wound electrode assembly 50 where a positive electrode plate 51 and a negative electrode plate 52 are wound with a separator 53 interposed therebetween, as shown in FIG. 5. The wound electrode assembly 50 shown in FIG. 5 is typically used in lithium ion batteries and is configured such that the separator 53 is interposed between the positive and negative electrode plates 51 and 52 and the resultant product is wound. The positive electrode plate 51 is formed by coating a positive electrode composite slurry containing a positive electrode active material, e.g., lithium oxide, on a positive electrode current collector made of a metal foil, e.g., an aluminum foil. The negative electrode plate 52 is formed by coating a negative electrode composite slurry containing a negative electrode active material, e.g., a carbon material, on a negative electrode current collector made of a metal foil, e.g., a copper foil. The wound electrode assembly 50 is housed in the pouch casing 30 and sealed except for an electrolytic solution injection hole. An electrolytic solution is injected through the electrolytic solution injection hole into the pouch casing and the electrolytic solution injection hole is sealed, thereby forming a secondary battery.

Electrode tabs 54 are drawn from each of the electrode plates 51 and 52 of the wound electrode assembly 50. Positive electrode tabs 54a are drawn from the positive electrode plate 51 and negative electrode tabs 54b are drawn from the negative electrode plate 52. Likewise in the stacked electrode assembly 40, a polymeric protective tape 56 for protecting each of the electrode terminals is adhered to each of the positive and negative electrode tabs 54a and 54b, thereby forming positive and negative electrode terminals, respectively.

In the stacked electrode assembly 40 and the wound electrode assembly 50, as shown in FIGS. 4 and 5, a first reinforcement member 60 is closely adhered to at least one plane thereof and accommodated in a pouch casing 30. The pouch casing 30 includes a case body 32, recessed to accommodate the electrode assembly 40 or 50, and a pouch cover 34 covering the case body 32 to be sealed. The shape of the pouch casing 30 is not particularly limited. Although not shown, a pouch casing having an opening in its one plane to be sealed, may be used to accommodate an electrode assembly. In this case, a seal portion is provided. For convenience, the invention will now be described with regard to the above-described pouch casing having a case body and a pouch cover. One skilled in the art will recognize that the invention has broad application to a variety configurations and is not limited to the embodiments described herein.

In the above-described pouch type secondary battery, the pouch casing 30 is preferably formed of a composite foil of a metallic material and a resin material. That is, the pouch casing 30 may be formed of a compressed composite material consisting of denatured polypropylene, e.g., cast polyproplylene (CPP), which is a thermally fusible polymer resin, inward with respect to a metal foil, e.g., an aluminum foil, and another CPP layer interposed between the metal foil and a resin material layer formed of nylon or polyethyleneterephthalate (PET). Thus, the pouch casing 30 can be sealed by thermal compression in a state in which the CPP layers are contacted with each other.

Next, a first reinforcement member closely adhered to the electrode assembly will be described. In the present invention, the first reinforcement member may be applied to both a stacked electrode assembly and a wound electrode assembly. The invention will be, for convenience, described with regard to the stacked electrode assembly. The features of the present invention are also applicable to the wound electrode assembly.

As shown in FIG. 4, a first reinforcement member 60 is closely adhered to at least one plane of the electrode assembly 40. In a preferred embodiment shown in FIG. 4, the first reinforcement member 60 is shaped of a panel so as to contact the upper face or bottom face of the electrode assembly 40. The first reinforcement member may have a first layer 60a made of a metal foil, e.g., aluminum, iron or stainless steel, and a second layer 60b made of an adhesive resin material, e.g., CPP, on a plane of the first layer 60a facing the electrode assembly 40. The second layer 60b may be formed by laminating an adhesive resin film on the first layer 60a made of a metal foil, or coating an adhesive resin material thereon. Also, the second layer 60b can be formed on the other plane of the first layer 60a opposite to the plane facing the electrode assembly 40.

The above-described first reinforcement member 60 is tightly fixed to the electrode assembly 40 such that the second layer 60b is adhered to the electrode assembly 40. If the second layer 60b is formed of a thermally adhesive material as described above, thermal compression can be employed. However, the second layer 60b made of a general adhesive resin can be adhered to the electrode assembly 40 simply by pressing the same onto the electrode assembly. Also, in the first reinforcement member 60, the first layer 60a may be formed of a fiber reinforced resin material rather than the metal foil.

The first reinforcement member may be formed of a single material of either a metal foil or a fiber reinforced resin material.

Figure 6:
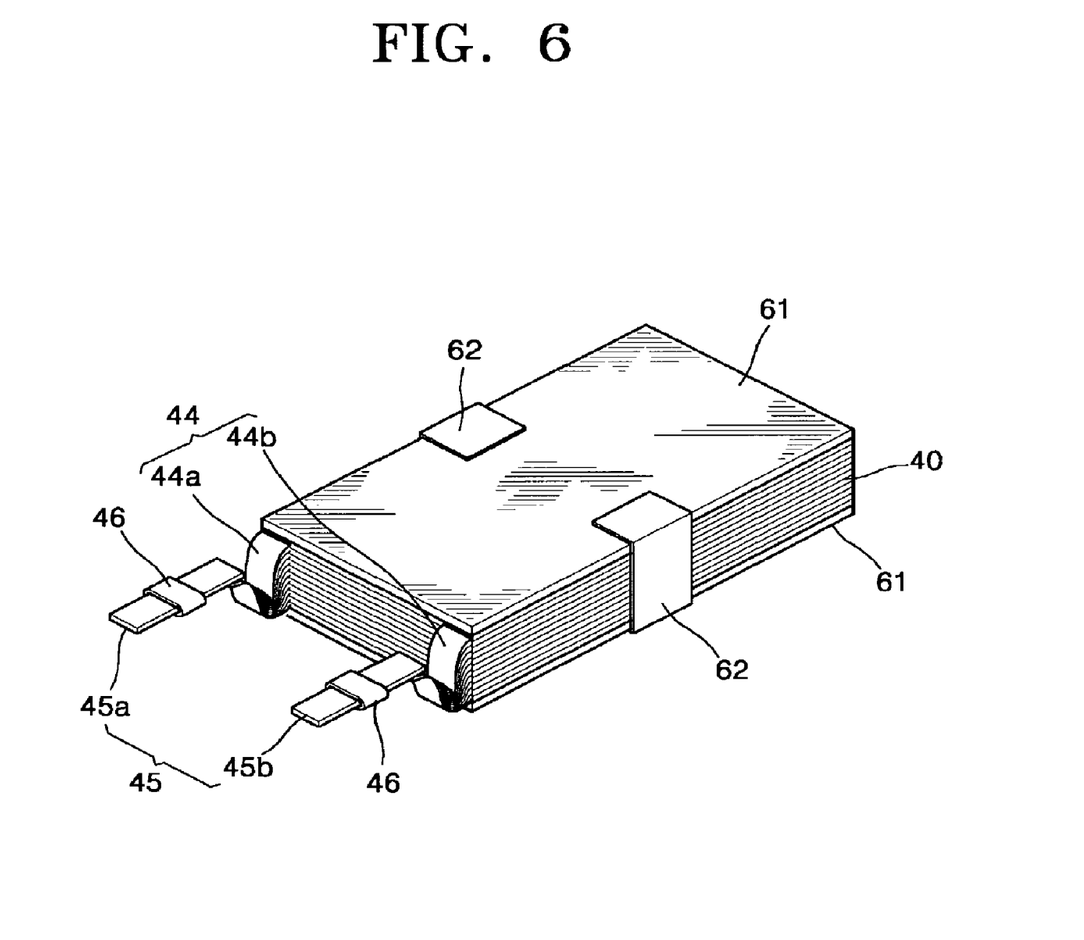
FIGS. 6, 7, 8, and 9 are perspective views illustrating electrode assemblies to which first reinforcement members according to various examples of the present invention are closely adhered.

As shown in FIG. 6, a first reinforcement member 61 may be fixed to the electrode assembly 40 using an insulating tape 62. Although not shown, the first reinforcement member can be accommodated in a pouch case in a state in which it is in close proximity to the electrode assembly but does not contact the electrode assembly.

Figure 7:
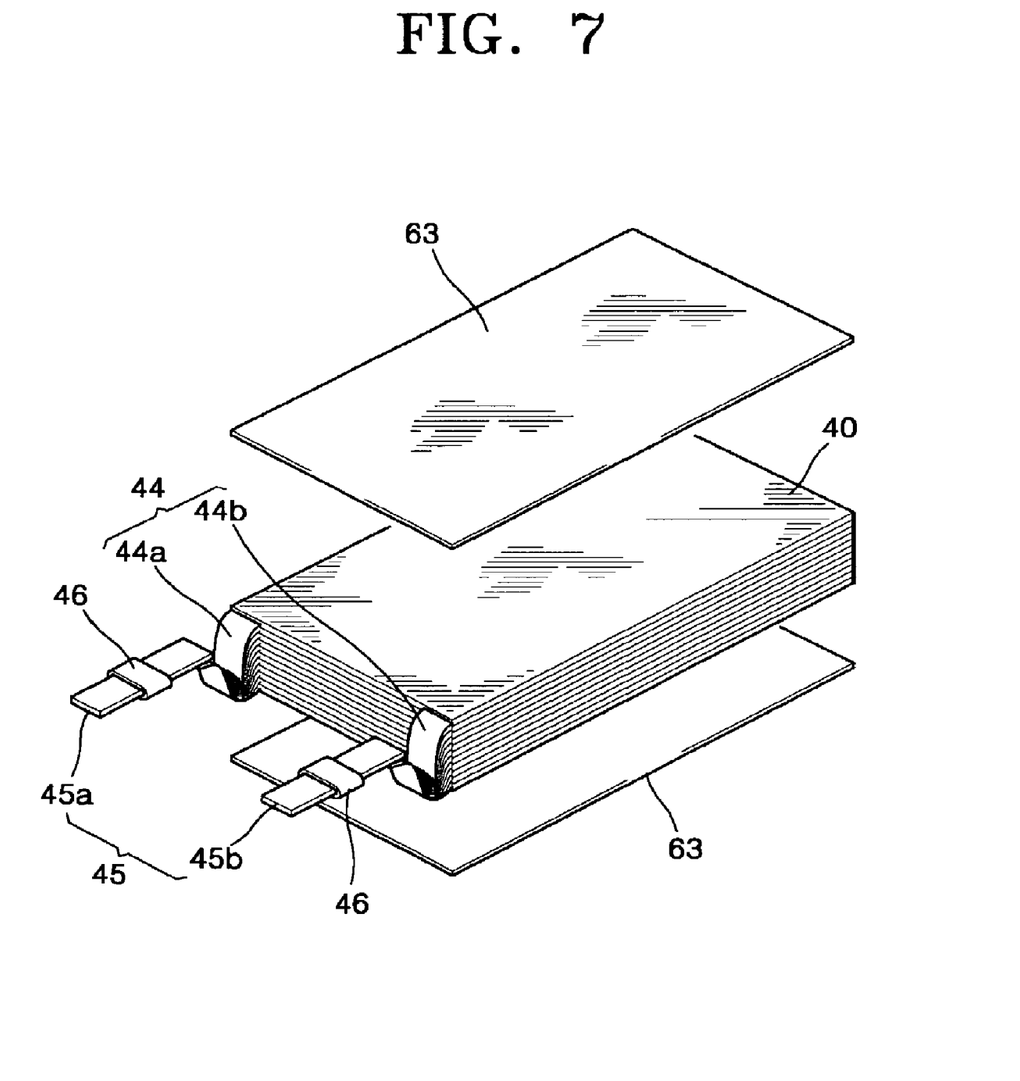
Figure 8:
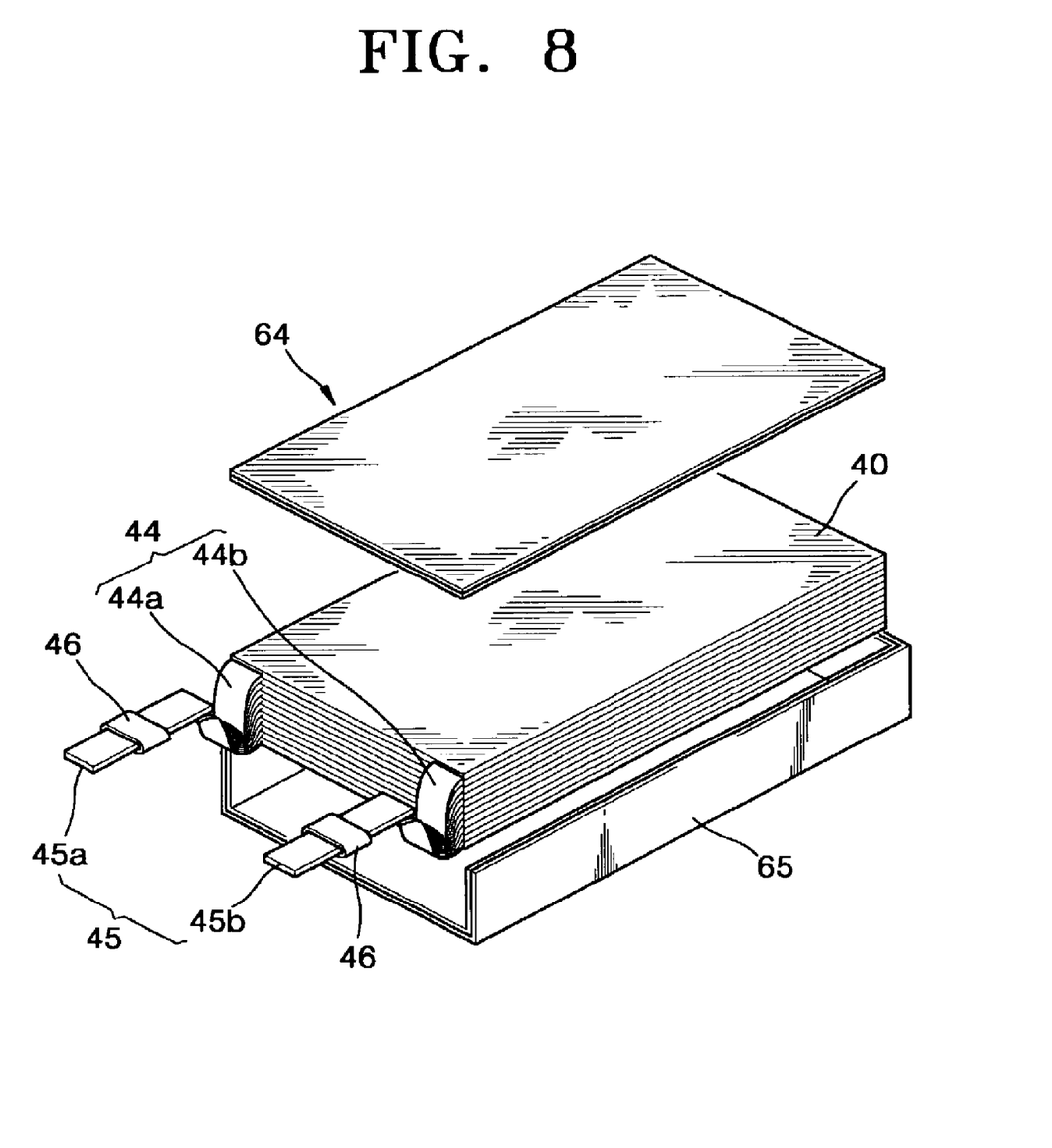
Figure 9:
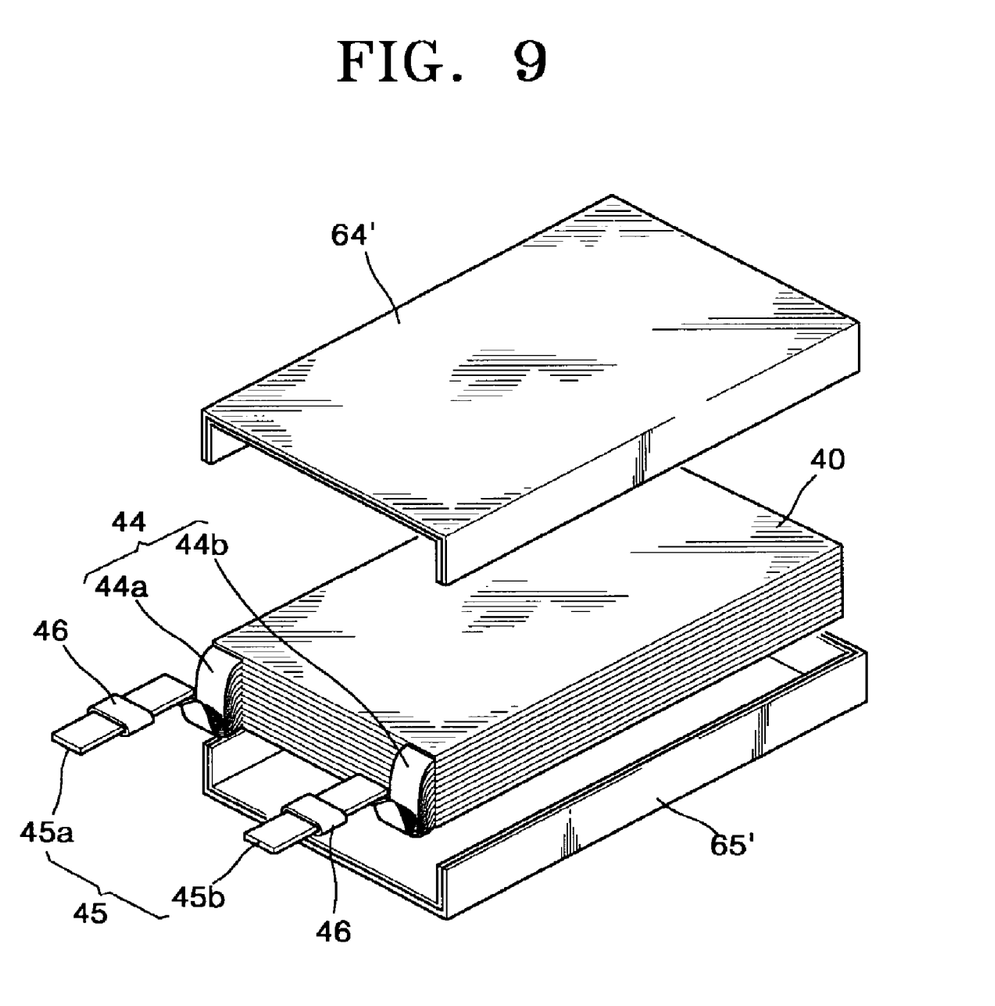

Also, a first reinforcement member 63, as shown in FIG. 7, may be formed of an insulating tape to be adhered to at least one plane of the electrode assembly 40. Such a first reinforcement member may have various shapes. As shown in FIGS. 8 and 9, the first reinforcement member may be formed on lateral surfaces of the electrode assembly 40. As shown in FIG. 8, the first reinforcement member is adhered to the electrode assembly 40 such that a lower reinforcement element 65 closely contacts the bottom surface, lateral surfaces and rear surface of the electrode assembly 40, and an upper reinforcement element 64 closely contacts the upper surface of the electrode assembly 40. Although not shown in the drawing, an insulating tape may be wrapped around the first reinforcement member for fixedly adhering the reinforcement member to the electrode assembly 40. Referring to FIG. 9, the first reinforcement member may be thermally compressed to the electrode assembly 40 such that an upper reinforcement element 64' closely contacts the upper surface and lateral surfaces of the electrode assembly 40, and a lower reinforcement element 65' closely contacts the bottom surface, lateral surfaces and rear surface of the electrode assembly 40. Also, the first reinforcement member may be fixed with the electrode assembly 40 using an insulating tape to then be closely adhered thereto. The upper and lower reinforcement members of the first reinforcement member may be formed of insulating tapes only.

The first reinforcement member is closely adhered to planes of an electrode assembly, thereby more effectively protecting the electrode assembly against external impacts when the electrode assembly is accommodated in a pouch casing. The electrode assembly may become swollen due to swelling occurring during an initial charging and discharging period of a battery. A short-circuit may occur at the edges of an electrode assembly due to swelling of the electrode assembly. Swelling of the electrode assembly can be prevented by closely adhering the reinforcement member to the outer surfaces of the electrode assembly, thereby reducing a change in external dimensions due to swelling.

Figure 10A:
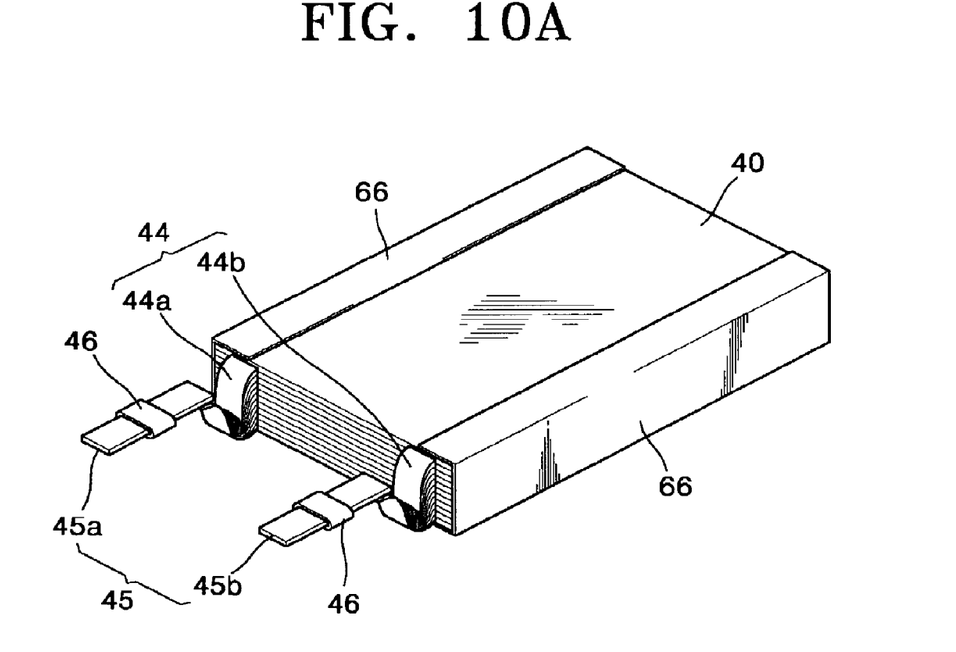
FIGS. 10A, 10B, 10C, and 10D illustrate the state in which an insulating tape and a terminal cover are coupled to an electrode assembly according to another embodiment of the present invention.
Figure 10B:
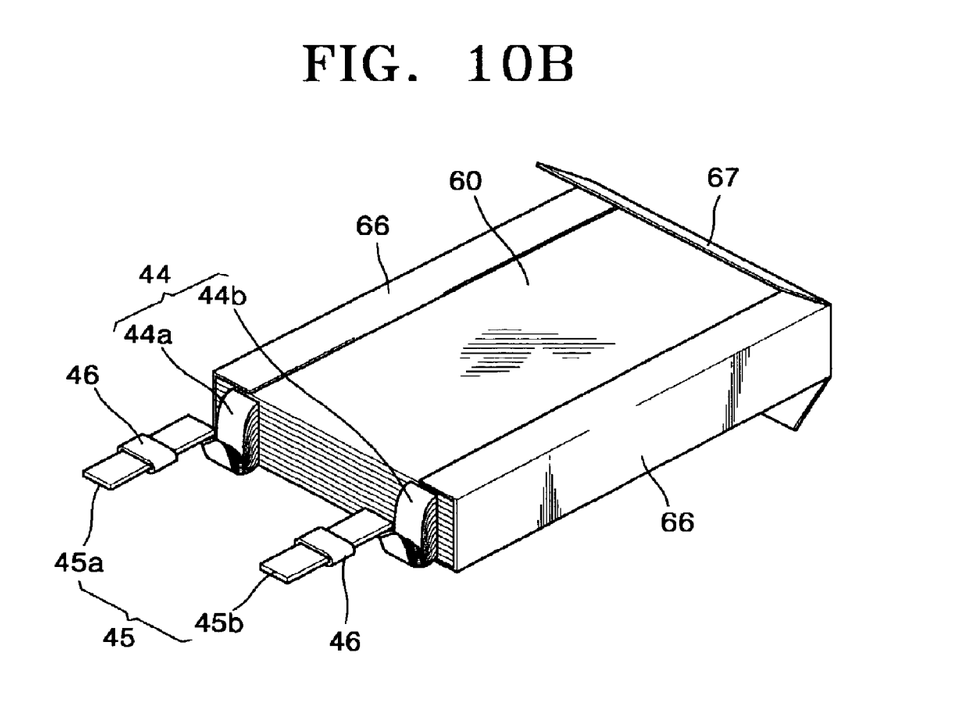

FIGS. 10A, 10B, 10C, and 10D illustrate a reinforcement member with an insulating tape adhered to the lateral planes of the electrode assembly 40. As shown in FIG. 10A, a side insulating tape 66 is adhered to both lateral planes of the electrode assembly 40. As shown in FIG. 10B, a rear insulating tape 67 is adhered to the rear plane of the electrode assembly 40. Although FIG. 10B shows lateral insulating tape 66, the invention is not limited thereto and may use only the rear insulating tape 67.

As shown in FIGS. 10A and 10B, adhering insulating tape to the lateral planes of the electrode assembly 40 is particularly advantageous for a stacked electrode assembly. A stacked electrode assembly is prone to short-circuit between positive and negative electrodes due to swelling. Short-circuit at edges of the electrode assembly can be prevented by simply adhering an insulating tape to the lateral planes of the electrode assembly.

Figure 10C:
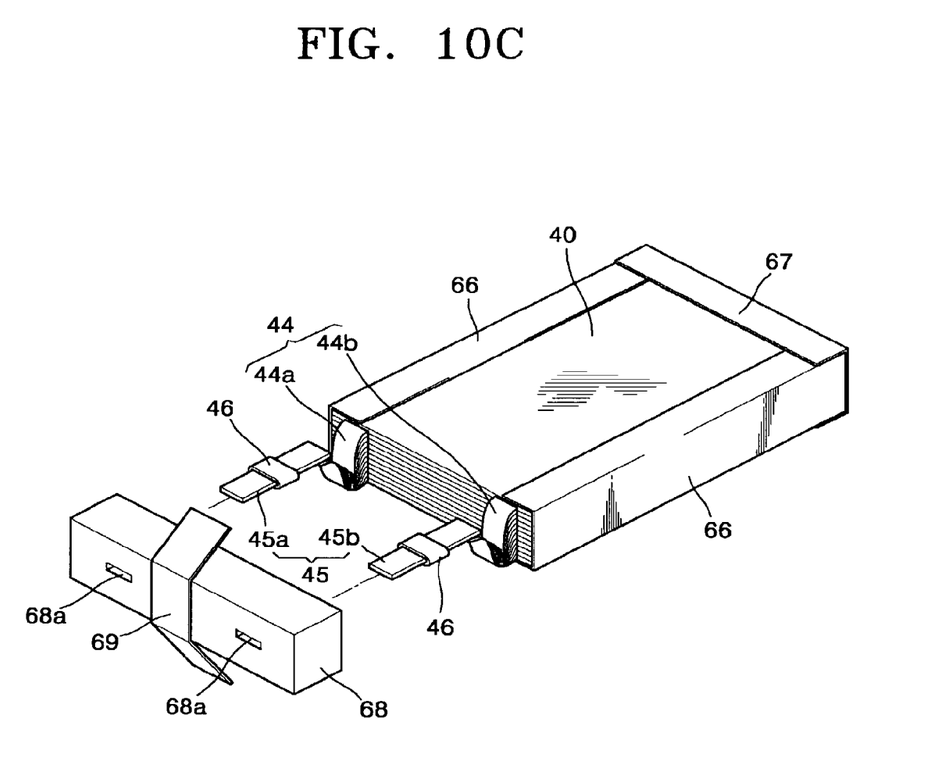
Figure 10D:
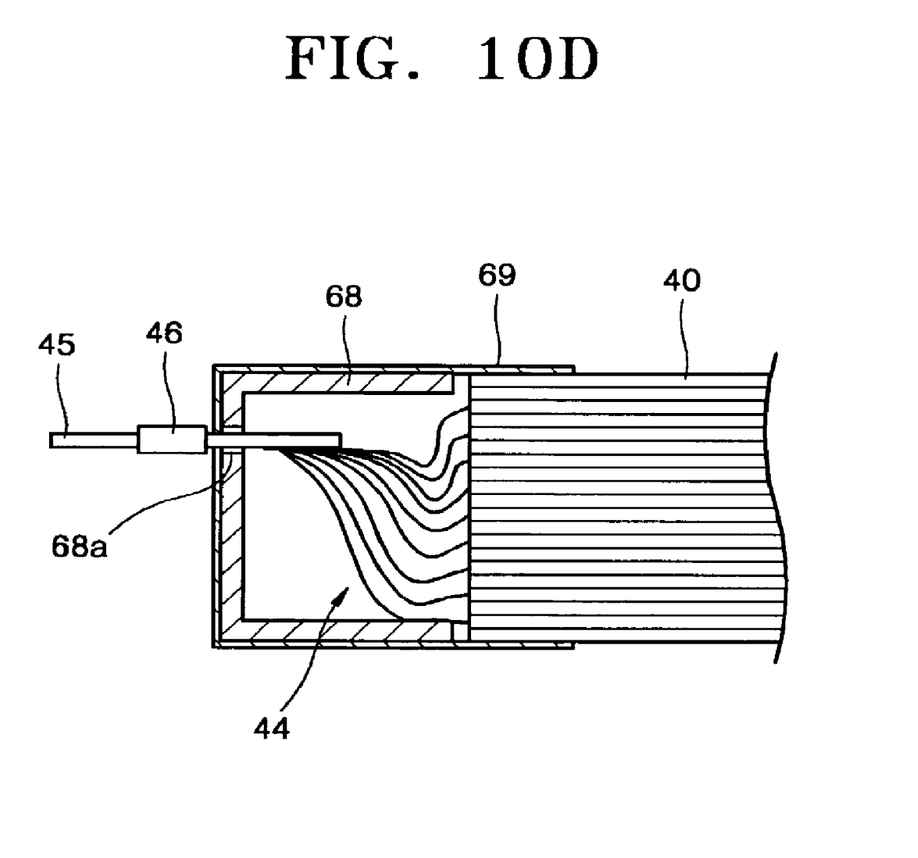

As shown in FIGS. 10C and 10D, the reinforcement member may have an insulating terminal cover 68 at the side where an electrode lead 45 is formed. The insulating terminal cover 68 may have insertion holes 68a into which the electrode leads 45 are inserted. The insulating terminal cover 68 can be coupled to the front face of the electrode assembly 40 using a separate insulating tape 69. As shown in FIG. 10D, the insulating terminal cover 68 allows the electrode lead 45 to be drawn out and protects the electrode tab 44 bent inside. Thus, the terminal cover 68 serves as both an insulator and a reinforcement member. The terminal cover 68 can be applied to the above-described previous embodiments of the present invention.

A reinforcement member may be formed directly in a pouch case as well as at the electrode assembly.

Figure 11:
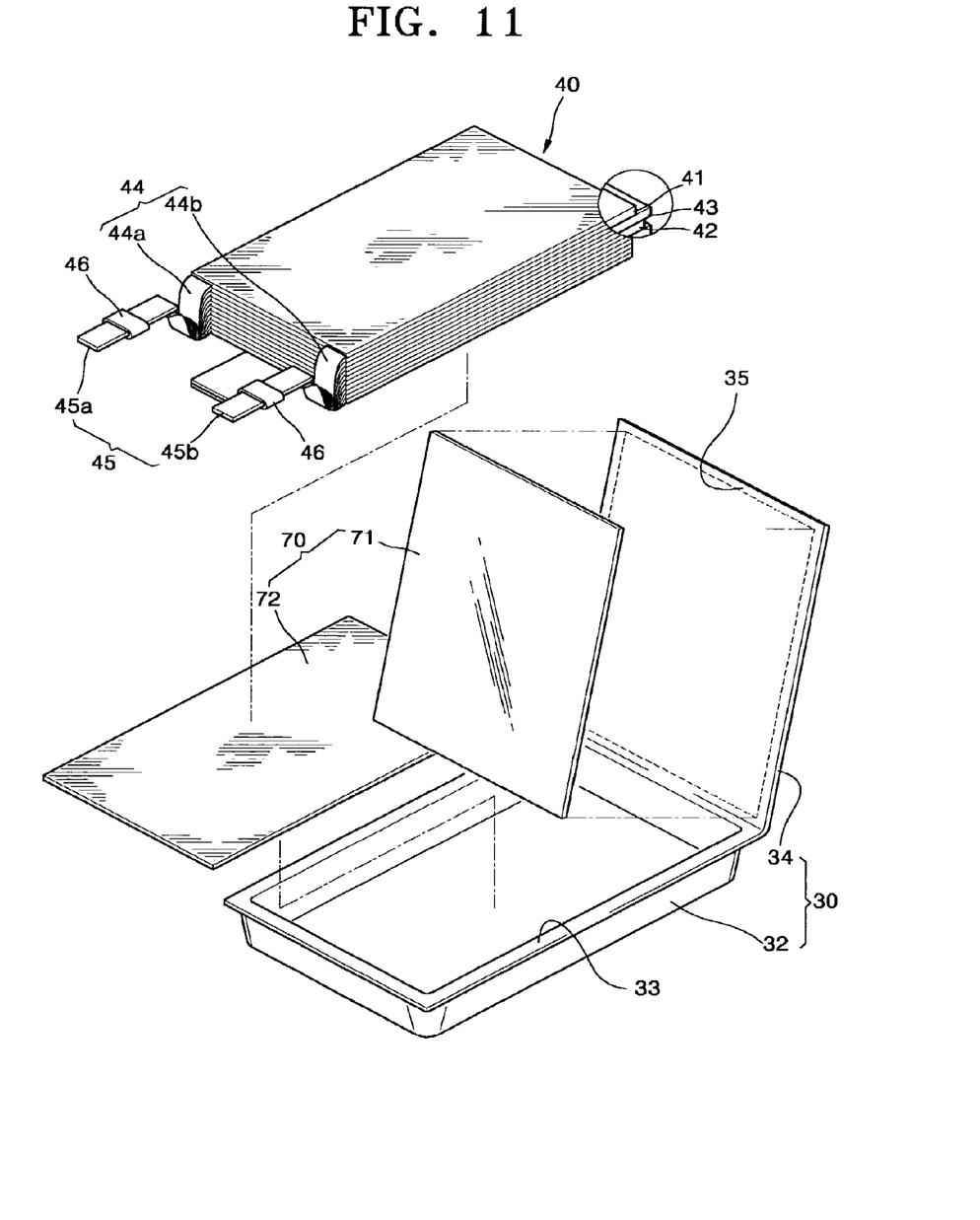
FIGS. 11, 12, and 13 illustrate the state in which a second reinforcement member is closely adhered to an electrode assembly according to other embodiments of the present invention.
Figure 12:
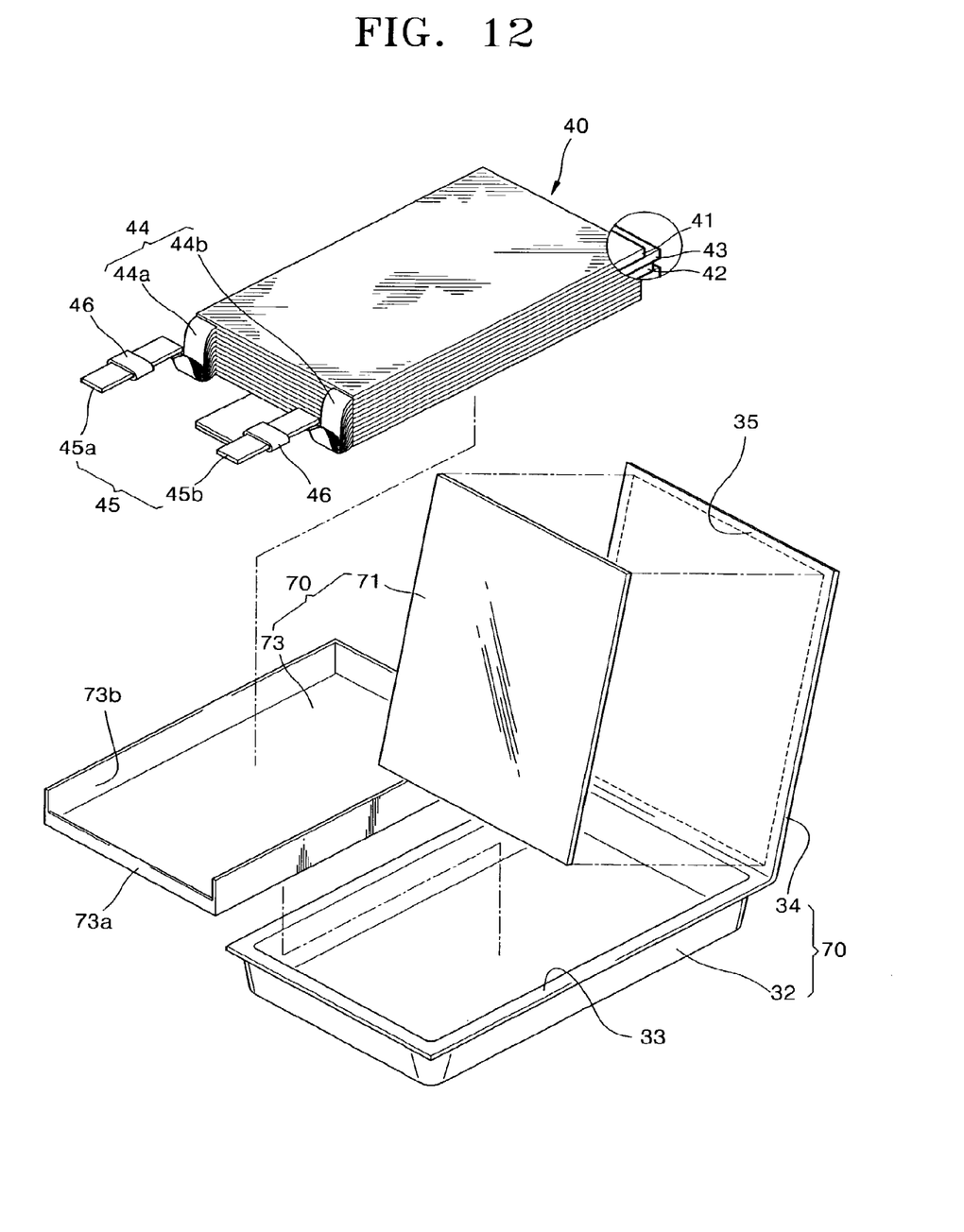

As shown in FIGS. 11 and 12, a pouch type secondary battery can be further reinforced by providing a second reinforcement member 70 closely adhered to at least one plane of internal faces of a pouch casing 30 where an electrode assembly is accommodated and sealed.

The second reinforcement member 70, as shown in FIG. 11, may have a bottom reinforcement element 72 adhered to the bottom of a case body 32 of the pouch casing 30, and a top reinforcement element 71 adhered to the internal ceiling of the pouch casing 30. The case body 32 and a pouch cover 34 of the pouch casing 30 are coupled to each other at a flange 33 of the case body 32. Thus, the top reinforcement element 71 is not preferably adhered to a periphery 35 of the pouch cover 34, corresponding to the flange 33 of the case body 33.

Unlike the plane-shaped bottom reinforcement element 72 shown in FIG. 11, a bottom reinforcement element 73 may be formed such that it is closely adhered to the internal faces of the case body 32, as shown in FIG. 12. In this case, the height of a lateral plane 73a at which electrode terminals are sealed is preferably smaller than that of the other plane 73b.

Figure 13:
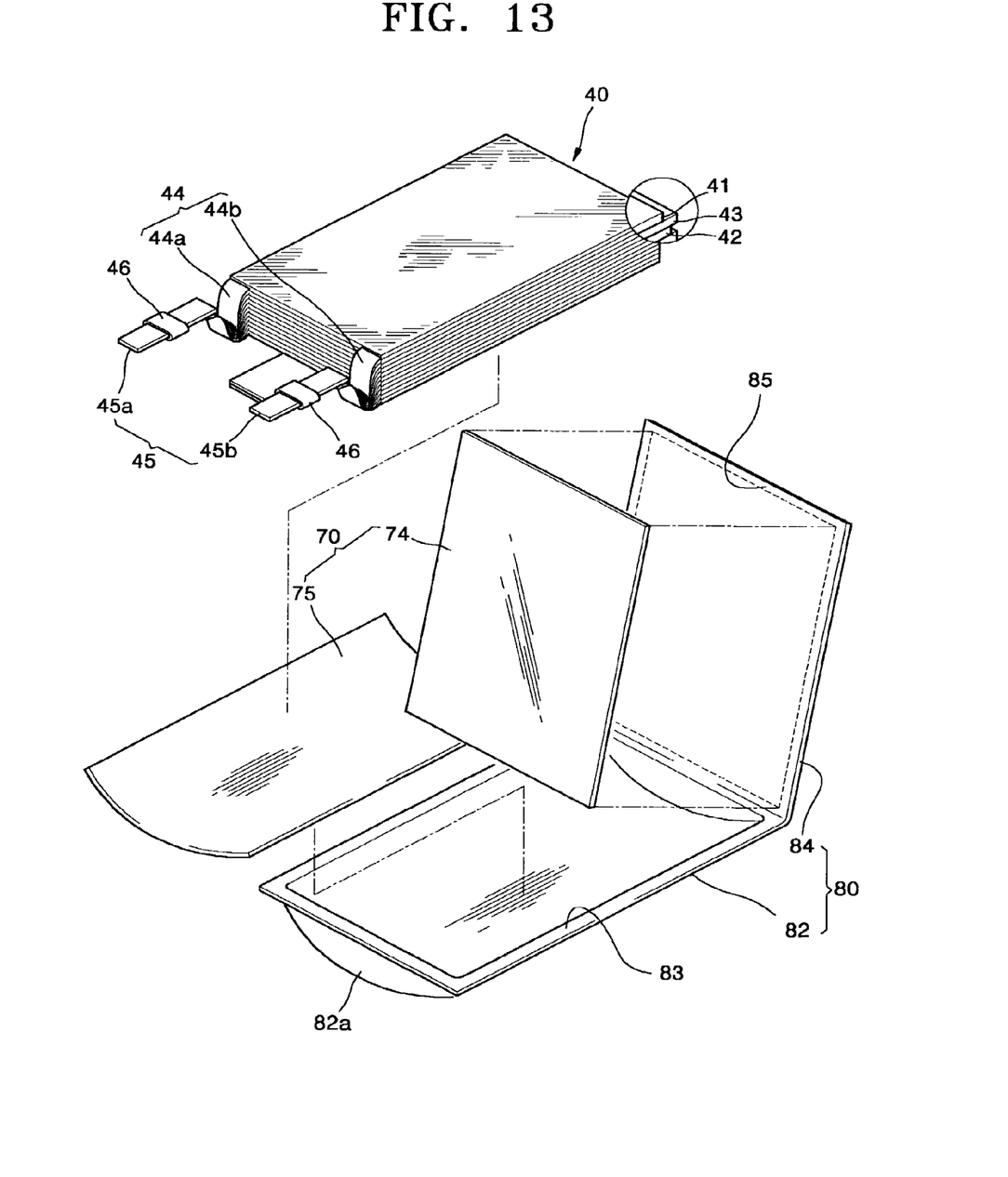

Referring to FIG. 13, the second reinforcement member 70 can also be applied to a pouch casing 80 having a round bottom 82a. As shown in FIG. 13, a bottom reinforcement element 75 having the same shape as the round bottom 82a is closely adhered to the bottom 82a of the case body 82. Also, although not shown, a reinforcement member can be provided at the front and/or rear planes of the pouch casing 80.

The second reinforcement member can be applied to any type of a pouch casing. For example, the second reinforcement member may be formed of a shape corresponding to that of the internal face of the pouch casing and closely contacted thereto.

Like the first reinforcement member, the second reinforcement member can be formed of a metal foil, a fiber reinforced resin material or an insulating tape, and can be closely adhered to the internal face of the pouch casing by thermal compression using an adhesive resin, except for the insulating tape which has intrinsic adhesiveness.

As described above, the present invention has the following advantages.

First, the safety of a pouch type secondary battery against external impacts can be enhanced, thereby increasing the reliability of the battery.

Second, internal short-circuit of a pouch casing, can be prevented.

Third, an reinforcing effect of a battery can be effectuated by a simple structure, thereby improving manufacturability.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A pouch type secondary battery comprising:
    an electrode assembly having positive and negative electrode plates with a separator interposed therebetween, and positive and negative terminal portions extending from the positive and negative electrode plates, respectively, the electrode assembly having an upper face and a bottom face;
    a reinforcement member adhered to the upper face, the bottom face, or both the upper face and the bottom face of the electrode assembly, and the reinforcement member comprising metal foil; and
    a pouch casing in which the electrode assembly is housed, wherein the positive and negative terminal portions extend outward from the pouch casing, the positive and negative terminal portions being insulated from each other at a sealed portion of the pouch casing, and the pouch casing comprising a metal layer,
    wherein the reinforcement member is not adhered to a side of the electrode assembly facing the sealed portion of the pouch casing.

2. The pouch type secondary battery of claim 1, wherein the reinforcement member comprises:
    a upper reinforcement member adhered to the upper face of the electrode assembly; and
    a lower reinforcement member adhered to the bottom face of the electrode assembly.

3. The pouch type secondary battery of claim 2, wherein the upper reinforcement member is extended to cover at least one of lateral surfaces between the upper face and the bottom face of the electrode assembly.

4. The pouch type secondary battery of claim 2, wherein the lower reinforcement member is extended to cover at least one of lateral surfaces between the upper face and the bottom face of the electrode assembly.

5. The pouch type secondary battery of claim 1, wherein the reinforcement member includes a first layer made of the metal foil and a second layer made of an adhesive resin material.

6. The pouch type secondary battery of claim 1, wherein the reinforcement member further comprises a fiber reinforced resin material.

7. The pouch type secondary battery of 1, wherein the reinforcement member further comprises a thermal adhesion layer adhered at a plane facing the electrode assembly.

8. The pouch type secondary battery of claim 1, wherein the reinforcement member is fixed to the electrode assembly by an insulating tape.

9. The pouch type secondary battery of 1, further comprising an insulating tape adhered to at least one plane of the electrode assembly.

10. The pouch type secondary battery of claim 1, further comprising an insulating terminal cover having insertion holes into which the positive and negative terminal portions are inserted and drawn outward.

11. The pouch type secondary battery of claim 1, further comprising an additional reinforcement member adhered to at least one surface of the pouch casing.

12. A pouch type secondary battery comprising:
    an electrode assembly having positive and negative electrode plates with a separator interposed therebetween, and positive and negative terminal portions extending from the positive and negative electrode plates;
    a pouch casing in which the electrode assembly is housed, wherein the positive and negative terminal portions extend outward from the pouch casing, the positive and negative terminal portions being insulated from each other at a sealed portion of the pouch casing, the pouch casing having an upper internal face and a bottom internal face facing an upper face and a bottom face of the electrode assembly, respectively, the pouch casing comprising a metal layer; and
    a reinforcement member adhered to the upper internal face, the bottom internal face, or both the upper internal face and the bottom internal face of the pouch casing, the reinforcement member comprising metal foil,
    wherein the reinforcement member is not adhered to the sealed portion of the pouch casing.

13. The pouch type secondary battery of claim 12, wherein the reinforcement member comprises:
    an upper reinforcement member adhered to the upper internal face of the pouch casing; and
    a lower reinforcement member adhered to the bottom internal face of the pouch casing.

14. The pouch type secondary battery of claim 13, wherein the upper reinforcement member is extended to cover at least one of lateral surfaces between the upper internal face and the bottom internal face of the pouch casing.

15. The pouch type secondary battery of claim 13, wherein the lower reinforcement member is extended to cover at least one of lateral surfaces between the upper internal face and the bottom internal face of the pouch casing.

16. The pouch type secondary battery of claim 12, wherein the reinforcement member has a first layer made of the metal foil and a second layer made of an adhesive resin material.

17. The pouch type secondary battery of claim 12, wherein the reinforcement member further comprises a fiber reinforced resin material.

18. The pouch type secondary battery of claim 12, wherein the reinforcement member further comprises a thermal adhesion layer adhered to a plane of the pouch casing facing the electrode assembly.

19. The pouch type secondary battery of claim 12, further comprising an additional reinforcement member adhered to at least one plane of the electrode assembly.

20. The pouch type secondary battery of claim 12, wherein a portion of the reinforcement member has a circular arc cross-section.

* * * * *